United States Patent [19]

Ueta

[11] Patent Number: 5,427,388
[45] Date of Patent: Jun. 27, 1995

[54] METALLIC GASKET

[75] Inventor: Kosaku Ueta, Kumagaya, Japan

[73] Assignee: Japan Metal Gasket Co., Ltd., Japan

[21] Appl. No.: 72,139

[22] Filed: Jun. 4, 1993

[30] Foreign Application Priority Data

Jun. 9, 1992 [JP] Japan ................... 4-174796

[51] Int. Cl.[6] ............................................. F16J 15/08
[52] U.S. Cl. ................... 277/235 B; 277/180
[58] Field of Search ............... 277/235 B, 180, 235 R, 277/233

[56] References Cited

U.S. PATENT DOCUMENTS

| 4,721,315 | 1/1988 | Ueta | 277/235 B |
| 4,799,695 | 1/1989 | Yoshino | 277/231 |
| 4,836,562 | 6/1989 | Yoshino | 277/235 B |

FOREIGN PATENT DOCUMENTS

| 0230804 | 8/1987 | European Pat. Off. | 277/235 B |
| 486817A1 | 5/1992 | European Pat. Off. | |
| 3741344 | 6/1989 | Germany | 277/235 B |
| 60-003465 | 1/1985 | Japan . | |
| 62-155374 | 7/1987 | Japan . | |
| 62-155376 | 7/1987 | Japan . | |
| 62-261760 | 11/1987 | Japan . | |
| 62-261761 | 11/1987 | Japan . | |
| 63-149480 | 6/1988 | Japan . | |
| 63-293363 | 11/1988 | Japan . | |
| 0035057 | 2/1989 | Japan | 277/235 B |
| 0083843 | 3/1989 | Japan | 277/235 B |
| 26855 | 1/1990 | Japan . | |
| 417883 | 4/1992 | Japan . | |
| 471865 | 6/1992 | Japan . | |
| 04165167 | 6/1992 | Japan . | |
| 05001771 | 1/1993 | Japan . | |
| 2053382 | 2/1981 | United Kingdom . | |
| 2115503 | 9/1983 | United Kingdom | 277/235 B |

Primary Examiner—Daniel G. DePumpo
Attorney, Agent, or Firm—Basile and Hanlon

[57] ABSTRACT

A metallic gasket of a structure in which a bead is formed to a base plate having at least one elastic metallic sheet, wherein a shim is secured to a flat portion of the base plate on the concave side of the bead at a position displaced from the center of the bead toward a bore hole of the base plate, with the ends of the base plate and the shim being aligned on the side of the bore hole, and the shim is extended into the bead with a contour matching the concave surface of the bead.

7 Claims, 3 Drawing Sheets

METALLIC GASKET

BACKGROUND OF THE INVENTION

1. Field of the Invention

The present invention concerns a metallic gasket disposed between the joining faces of a cylinder head and a cylinder block that constitute an internal combustion engine to prevent combustion gas, cooling water, lubricant or the like from leaking.

2. Description of the Prior Art

In an internal combustion engine, a gasket is interposed between a cylinder block and a cylinder head to provide a seal therebetween. The materials of the gasket for a gasoline engine use a mixture of asbestos and rubber and have a spiked steel sheet embedded therein. A bore site peripheral edge covered with a stainless steel sheet and a peripheral edge of bolt holes covered with a copper sheet, respectively, are used as a countermeasure for a gap between the seal and the joining faces of the cylinder block and the cylinder head.

Further, for a diesel engine, a material comprising asbestos, rubber and a wire gauge embedded therein is used as a countermeasure for a gap at the edges and the joining faces as described above and a fire ring is further engaged along the edge of the bore.

Such gaskets are referred to as soft gaskets. However, since asbestos is used in gaskets of this type, its use has become restricted, particularly in view of environmental problems.

As far as the inventor knows, synthetic fibers are used instead of asbestos in a gasoline engine. Further, for a diesel engine, a structure comprising a steel laminate including a steel sheet base plate formed with a minute bead, a stainless steel subplate stacked thereon and a steel wire core disposed to the bore peripheral edge is used. The subplate is folded back to cover the wire on the inside and extends along the upper surface of the edge of the bore holes. A baked rubber seal ring is disposed at the bolt holes.

The soft gaskets are not satisfactory for providing reduced thickness, endurance to cope with decreasing distance between bores, engine weight and size reduction, material recycling, heat resistance, high performance, cost reduction and freedom of design. Eventually the demand for metallic gaskets will increase in the automobile industry.

By the way, in a metallic gasket, a bead is formed along the periphery of holes, in particular, at the periphery of combustion chamber holes (hereinafter referred to as a bore hole or bore holes). When a metallic gasket is tightened between a cylinder head and a cylinder block, the bead is elastically deformed to function as a seal. Further, a stopper is formed, together with the bead, at the periphery of the bore hole in the metallic gasket. The stopper suppresses vibrations at the joining face area between the cylinder block and the cylinder head caused by the operation of the engine, so that it also functions as a sealing member to prevent fatigue failure on account of engine vibrations. In the metallic gasket, a complete sealing effect is intended by attaining a primary seal with the stopper and a secondary seal with the bead compensated with the durability by the stopper.

The stopper may be formed by folding back a subplate described above so as to cover the inner circumferential surface of the bore hole, or it may be formed by arc plasma spray on a gasket base plate or as a metal shim.

In any case, the stopper must have a thickness corresponding to a gap in the engine, that is, a gap between the joined surfaces of the cylinder block and the cylinder head.

Recently, with the performance improvement owing to the progress in engine technology, fuel economy and the size and weight reduction, the distance between bores has been narrowed. In addition, the combustion temperature and the explosive pressure have increased due to the adoption of super-chargers. Accordingly, with the prior art, the width of the stopper cannot be increased and it is difficult to impede the bead vibrations. Further, as the engine temperature becomes higher, the pressure exerted on the gasket surface increases because of the combustion expansion, and denting into the aluminum cylinder head is caused when a narrow shim stopper is used. Further, complete sealing has become difficult. A double seal with a stopper primary seal and a bead secondary seal cannot be obtained. In addition, since the shim stopper is not fixed to the base plate, it sometimes slides or becomes detached.

This invention has been accomplished in view of the foregoing situation and it is an object thereof to provide a metallic gasket with a shim, even if a distance between bores is narrow, which is also capable of adjusting the bead spring force.

As an example of the metallic gasket in the relevant prior art, the invention has accomplished an invention as disclosed in Japanese Patent Publication Hei 2 (1990)-58502 and, further is well aware of Japanese Patent Laid-Open Sho 62 (1987)-155376 and Japanese Patent Publications Hei 3 (1991)-20626 and Hei 4 (1993)-40540.

SUMMARY OF THE INVENTION

To attain the foregoing object, the invention provides a metallic gasket in which a bead is formed on at least one elastic metal sheet base plate, whereon a shim is secured to a flat portion of the base plate on the bore hole edge of the concave bead at a position away from the center thereof, with the ends of the base plate and the shim being aligned on the side of the bore hole. The shim extends into the bead with a matching concave contour of the bead to compensate for the spring constant of the bead.

Then, the extended width of the shim varies from 110% to about 200% of the width of the flat portion depending on the attaching position of the shim.

That is, the extension width of the shim is reduced near bolt holes, while the width is increased between the bolt holes. This is because the spring constant of the bead can be small near the bolt holes since the tightening surface pressure is large and the gap is small at the joint area of the cylinder block and the cylinder head. However, the spring constant of the bead has to be increased in the portion between the bolt holes since the tightening surface pressure is smaller and the gap is larger.

Thus, the shim is disposed with a contour matching the concave surface of the bead, and the shim extension into the bead is made larger between the bolt holes where the surface pressure is the lowest, and it is reduced near the bolt holes where the surface pressure is high, thereby making the spring force uniform.

However, according to the experience of the inventor, in a case where the flat portion of the base plate to which the shim is attached is extremely narrow as in the case of an engine with a narrow inter-bore gap, the shim width has to be narrowed corresponding and, if the extension of the shim into the bead is smaller than about 110% of the width of the flat portion, it is impossible to prevent a dent from being formed by the shim on the engine. That is, unless the extension of the shim into the bead is at least about 110% of the flat portion of the base plate, it is so narrow that a dent is formed on the engine.

On the other hand, if the extension of the shim into the bead exceeds about 200% of the width of the flat portion, it causes undesirable interference of the shim in a narrow inter-bore gap engine.

Further, the shim can be applied where the flat portion near the bolt hole has to be very narrow. This can be accomplished by fixing the shim to the base plate so that the shim edge extends into the bead and a flat portion is secured to the flat portion of the base plate.

Then the thickness of the shim is usually made less than the thickness of the base plate, and it can be conformed to an uneven gap at the joint of the cylinder head and the cylinder block.

Further, another base plate may be disposed to the base plate described above with the recess of the bead of another base plate facing the recess of the bead of the baseplate described to form a structure wherein the shim is sandwiched between the two base plates so that it can cope with engine temperature deformation.

In addition to the constitution described above, if an intermediate plate is placed between the shimmed base plate and the base plate, it can enhance the sealing effect of the base plate and also function as a spacer.

Then, in addition to the constitution described above, the combined state of the shim and the base plate may be turned over and another base plate stacked thereover with the recesses of the beads being in the same direction. The amount of spring restoration is reduced and the spring rigidity is increased.

DESCRIPTION OF THE PREFERRED EMBODIMENTS

Example 1

Figure 1:
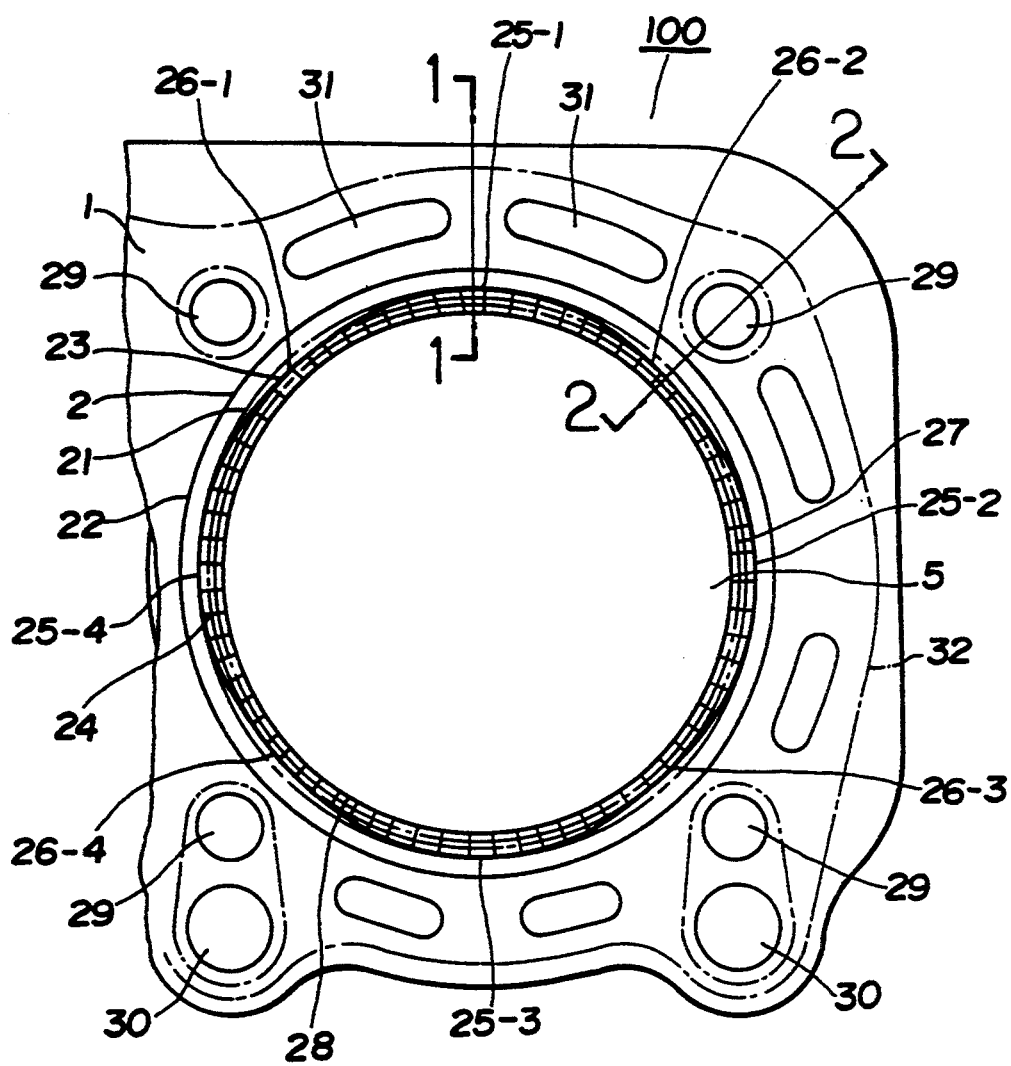
FIG. 1 is a plan view of a typical embodiment of a metallic gasket of the present invention.

As shown in FIG. 1, a metallic gasket, which is entirely depicted as reference number 100, comprises an elastic metallic sheet (hereinafter referred to as a base plate) 1. A bore hole (for a combustion chamber bore) 5 corresponds to the cylinder bore number of a cylinder block, not shown.

A bead 2 is formed in the base plate 1 along a periphery of the bore hole and the circle 21 shown by a chain line represents the crest of the bead 2.

A shim 24 is an annular plate having an inner diameter equal to the diameter of the bore hole 5 in the base plate 1, with the inner diameter aligned with the bore hole 5. As shown in FIG. 1, the base plate 1 has bolt holes 29 at a position determined by dividing the circumference of the bore hole 5 into four even parts. Oil holes 30 are situated near two of the four bolt holes 29 and a cocoon-shaped water hole 31 is formed between the bolt holes 29.

As can be seen from FIG. 1, the outer diameter of the shim 24 is smaller close to the bolt holes 29 and is larger at a portion between the bolt holes 29. In this embodiment, a portion of the shim 24 protruding into the bead 2 extends to the maximum, i.e., at crest line 21, while a portion thereof protrudes slightly into the edge of the bead 2 where it is close to one bolt hole 29.

That is, in this embodiment, assume the width of a flat portion 1a of the base plate 1 as 100%, the width of the protruding portion of the shim 24 that extends as far as the crest line 21 of the bead 2 is 200%, and the width of the slightly protruding portion thereof is 110%.

As described above, the outer diametrical shape of the shim 24 is not true circular while the bore hole 5 is a true circle. The shim diameter is smaller at portions 26-1, 26-2, 26-3 and 26-4 near the bolt holes 29 and the shim diameter is larger at portions 25-1, 25-2, 25-3 and 25-4 corresponding to the intermediate area between the bolt holes 29.

Figure 2A:
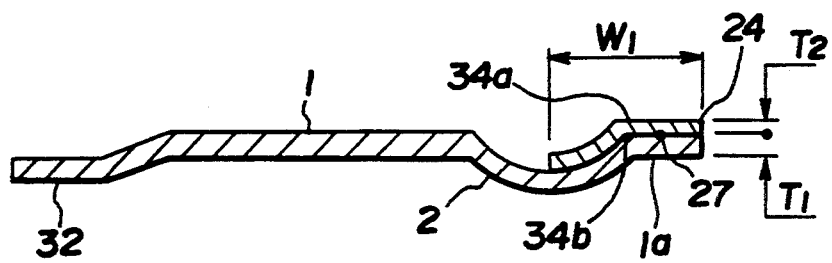
FIG. 2(a) is a cross sectional view taken along line A—A in FIG. 1.
Figure 2B:
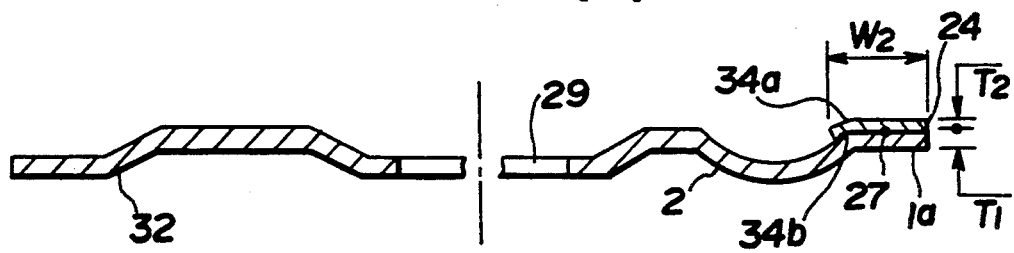
FIG. 2(b) is a cross sectional view taken along line B—B in FIG. 1.

FIG. 2(a) shows the intermediate area between the bolt holes 29, taken along line A—A in FIG. 1. In this portion, the shim 24 extends as far as the crest of the bead 2. The width of the shim 24 is depicted by $W_1$. FIG. 2(b) shows a portion near the bolt hole 29, taken along line B—B in FIG. 1, in which the shim 24 extends slightly into the bead 2. The width of the shim 24 is depicted by $W_2$. Then, as shown in FIGS. 2(a) and 2(b), it is apparent that the width or extending amount of the shim 24 has a relationship: $W_1 > W_2$ for the area between the bolt holes 29 and the portion near the bolt holes 29. FIGS. 2(a) and 2(b) also show that the shape for the outer edge of the shim 24 varies along the circumferential edge thereof.

By the way, as shown in FIGS. 2(a) and 2(b), the thickness $T_2$ of the shim 24 is about one-half the thickness $T_1$ of the base plate 1. Since the shim 24 is used to reinforce the base plate 1, it is preferred to keep the thickness thereof as necessary for the reinforcement and to make it as thin as possible so that it will conform to the joint area between the cylinder block and the cylinder head.

FIGS. 2(a) and 2(b) show an embodiment in which an edge 34a of the shim 24 protruding into the bead 2 and a flat portion is stacked and secured to the base plate 1 and is aligned with the edge 34b of the base plate 1 which is contiguous from a flat portion 1a on the side of the bore hole 5 to the bead 2. In a case where the flat portion near the bolt hole 29 is extremely narrow as shown in FIG. 1, the border edge 34a of the shim 24 may be displaced from the edge portion 34b of the base plate 1 to the bead 2 so as to overhang in the bead 2 as shown in FIG. 2(c).

Figure 2C:
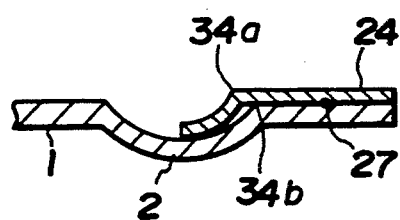
FIG. 2(c) is a cross sectional view illustrating a preferred embodiment of shim edge which protrudes into a bead.

In this way, the flat portion of the shim 24 is secured to the flat portion 1a of the bore hole 5 of the base plate 1 as shown by reference number 27 in FIGS. 2(a), 2(b) and 2(c) by bonding or welding. In this case, the end of the flat portion 1a of the base plate 1 near the bore 5 and the end of the flat portion of the shim 24 have to be aligned.

Thus, when the shim 24 is appended to the base plate 1, insufficient or uneven surface pressure caused by a gap variation at the joint area between the cylinder head and the cylinder block can be eliminated. The necessary spring constant can be attained and effectively ensures a seal without over tightening the shim 24 which could cause a dent in the cylinder head. In this arrangement, since the flat portion of the shim 24 covers the edge 34b of the base plate 1 on the side of the bore hole 5, the pressure exerted on the surface at the edge becomes highest to improve the sealing effect.

Example 2

Figure 3:
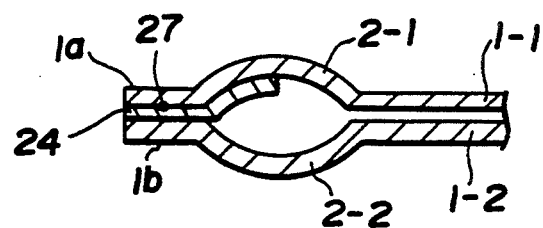
FIG. 3 is a cross sectional view of another embodiment.

FIG. 3 shows another embodiment of the present invention. In this embodiment, two base plates 1-1 and 1-2 are joined with the recesses of the beads 2-1 and 2-2 facing each other. A shim 24 is secured at a flat portion 1a of the base plate 1-1. Another base plate 1-2 is appended to the lower surface of the shim 24 so that the shim 24 is sandwiched between the two base plates 1-1 and 1-2. FIG. 3 shows an intermediate position between the bolt holes 29 shown in FIG. 1, in which the extended shim 24 reaches the crest of the bead 2-1.

This embodiment is effective in coping with engine deformation due to the temperature.

Example 3

Figure 4:
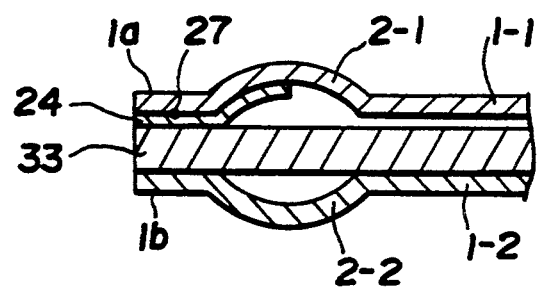
FIG. 4 is a cross sectional view of yet another embodiment.

FIG. 4 shows an addition to the construction of the embodiment shown in FIG. 3. An intermediate plate 33 is interposed between the shim 24 and a base plate 1-2. This can provide an effective seal and also function as a spacer.

Example 4

Figure 5:
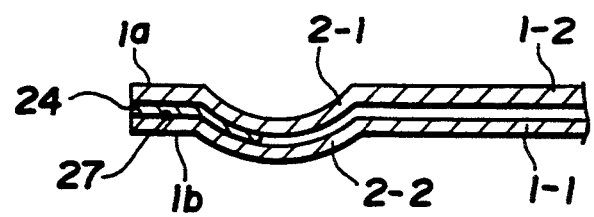
FIG. 5 is a cross sectional view of a different embodiment.

FIG. 5 shows another addition to the construction of the embodiment shown in FIG. 3. The combined shim 24 and base plate 1-1 is turned over and a base plate 1-2 is stacked thereover such that the recesses of the beads 2 are in the same direction. This embodiment is suitable to reduce the restoration force and to increase the spring rigidity.

As has been described above, it can be understood that the spring constant can be varied by controlling the width of the shim and the surface pressure of the edge at the bore hole can be increased on the concave side of the bead so that the sealing effect can further be improved by this invention.

What is claimed is:

1. A metallic gasket comprising:
   at least one base plate having at least one elastic sheet;
   at least one bore hole, a flat portion disposed around the bore hole, and a bead concentrically disposed around the flat portion formed in the elastic sheet;
   a shim secured to the flat portion of the elastic sheet and having a flat portion and an extended portion disposed around the flat portion of the shim, the flat portion of the shim covering the entire surface of the flat portion of the elastic sheet, and the extended portion extending into the bead with a contour of the shim matching and extending along a concave surface of the bead to cover a part of the concave surface of the bead; and
   a bore hole side end face of the shim aligned with a bore hole side and end face of the base plate.

2. A metallic gasket comprising:
   at least one base plate having at least one elastic sheet;
   at least one bore hole, a flat portion disposed around the bore hole, and a bead concentrically disposed around the flat portion formed in the elastic sheet;
   a shim secured to the flat portion and extending into the bead with a contour of the shim matching and extending along a concave surface of the bead; and
   a bore hole side end face of the shim aligned with a bore hole side and end face of the base plate, wherein the width of the shim extending into the bead is varied from 110 to 200% of a width of the flat portion of the base plate depending on the circumferential position of the shim with respect to the base plate.

3. The metal gasket as defined in claim 1, wherein the shim is secured to the flat portion of the base plate such that a boundary edge between the extended portion extending into the bead and the flat portion of the shim is disposed at a position in the bead so as to overhang in the bead.

4. The metallic gasket as defined in claim 1, wherein the thickness of the shim is less than the thickness of the base plate.

5. The metallic gasket as defined in claim 1, wherein another base plate is disposed adjacent to the one base plate, with a concave portion of a bead of the another base plate facing the concave bead of the one base plate and the shim is sandwiched between the base plates.

6. The metallic gasket as defined in claim 1, wherein another base plate is disposed adjacent to the one base plate, with a concave portion of the another base plate facing the concave of the bead of the one base plate and an intermediate plate is disposed between the another base plate and the shim, so that the shim and the intermediate plate are sandwiched between the base plates.

7. The metallic gasket as defined in claim 1, wherein another base plate is disposed adjacent to the first base plate with the concave of the bead of the one base plate being aligned with a bead of the other base plate when the other base plate is placed over the shim.

* * * * *

UNITED STATES PATENT AND TRADEMARK OFFICE
CERTIFICATE OF CORRECTION

PATENT NO. : 5,427,388
DATED : June 27, 1995
INVENTOR(S) : Kosaku Ueta

It is certified that error appears in the above-indentified patent and that said Letters Patent is hereby corrected as shown below:

Column 2, line 52, after "near" insert --the--.

Column 3, line 3, delete "corresponding" and insert --correspondingly--.

Column 3, line 46, delete "A-A" and insert --1-1--.

Column 3, line 48, delete "B-B" and insert --2-2--.

Column 4, line 2, after "hole" insert --5--.

Column 4, line 11, delete "a cocoon-shaped water hole 31 is" and insert --cocoon-shaped water holes 31 are--.

Column 4, line 26, delete "true" and insert --truly--.

Column 4, line 33, delete "A-A" and insert --1-1--.

UNITED STATES PATENT AND TRADEMARK OFFICE
CERTIFICATE OF CORRECTION

PATENT NO. : 5,427,388
DATED : June 27, 1995
INVENTOR(S) : Kosaku Ueta

It is certified that error appears in the above-indentified patent and that said Letters Patent is hereby corrected as shown below:

Column 4, line 37, delete "B-B" and insert --2-2--.

Column 5, line 22, delete "Another" and insert --A flat portion 16 of another--.

Signed and Sealed this

Fourteenth Day of November, 1995

*Attest:*

BRUCE LEHMAN

*Attesting Officer*    *Commissioner of Patents and Trademarks*